United States Patent
Takaba (10) Patent No.: US 7,224,648 B2
(45) Date of Patent: May 29, 2007

(54) OPTICAL RECORDING AND REPRODUCTION APPARATUS INCLUDING STABLE AND INEXPENSIVE SERVO CONTROL MECHANISM

(75) Inventor: Sadayuki Takaba, Osaka (JP)

(73) Assignee: Funai Electric Co., Ltd., Daito-shi (JP)

( * ) Notice: Subject to any disclaimer, the term of this patent is extended or adjusted under 35 U.S.C. 154(b) by 518 days.

(21) Appl. No.: 10/902,449

(22) Filed: Jul. 29, 2004

(65) Prior Publication Data

US 2005/0025001 A1 Feb. 3, 2005

(30) Foreign Application Priority Data

Jul. 29, 2003 (JP) ............................ 2003-282019

(51) Int. Cl.
*G11B 7/00* (2006.01)

(52) U.S. Cl. ................................ 369/44.36; 369/44.29; 369/44.35

(58) Field of Classification Search ............... None
See application file for complete search history.

(56) References Cited

U.S. PATENT DOCUMENTS

| | | | | |
|---|---|---|---|---|
| 4,942,564 A | * | 7/1990 | Hofer et al. ............. | 369/44.35 |
| 5,251,194 A | * | 10/1993 | Yoshimoto et al. ....... | 369/44.29 |
| 5,612,939 A | * | 3/1997 | Ueki et al. .............. | 369/47.11 |
| 5,953,296 A | * | 9/1999 | Baba ..................... | 369/44.29 |
| 6,011,762 A | * | 1/2000 | Watanabe et al. ........ | 369/44.25 |

FOREIGN PATENT DOCUMENTS

| | | |
|---|---|---|
| JP | 2-5228 | 1/1990 |
| JP | 3-1332 | 1/1991 |
| JP | 6-176371 | 6/1994 |
| JP | 11-154337 | 6/1999 |
| JP | 2002-298373 | 10/2002 |

OTHER PUBLICATIONS

Patent Abstracts of Japan, Publication No. 06-176371 dated Jun. 24, 1994, 1 pg.
Patent Abstracts of Japan, Publication No. 02-005228 dated Jan. 10, 1990, 1 pg.
Patent Abstracts of Japan; Publication No. 2002-298373 dated Oct. 11, 2002 (1 page).
Patent Abstracts of Japan; Publication No. 06-176371 dated Jun. 24, 1994 (1 page).
Patent Abstracts of Japan; Publication No. 03-001332 dated Jan. 8, 1991 (1 page).
Patent Abstracts of Japan; Publication No. 11-154337 dated Jun. 8, 1999 (1 page).

* cited by examiner

*Primary Examiner*—Thang V. Tran
(74) *Attorney, Agent, or Firm*—Osha Liang LLP (57) ABSTRACT

Regions A–F of photodetectors output electric signals a–f respectively, in accordance with an amount of reflected light from an optical disc 1. The electric signals a–f are input to A/D converters through an RF amplifier unit respectively. An arithmetic circuit subjects the electric signals a–f to arithmetic processing, so as to generate a focus error signal FE and a tracking error signal TE. A CPU measures a DC level of an output signal from the A/D converter, and transmits control signals OCa–OCf to a variable resistor in the RF amplifier unit so that a difference between the DC level and a median in a dynamic range of the A/D converter attains "0". The CPU transmits control signals GCa–GCf to a variable resistor in the RF amplifier unit so that output amplitude of an output signal is within the dynamic range.

3 Claims, 5 Drawing Sheets

OPTICAL RECORDING AND REPRODUCTION APPARATUS INCLUDING STABLE AND INEXPENSIVE SERVO CONTROL MECHANISM

BACKGROUND OF THE INVENTION

1. Field of the Invention

The present invention relates to an optical recording and reproduction apparatus, and more particularly to focusing control and tracking control in an optical pickup device provided in an optical recording and reproduction apparatus.

2. Description of the Background Art

An optical recording and reproduction apparatus includes an optical pickup device as a device for recording information on a disc medium in a stable manner and reproducing the information with fidelity. The optical pickup device is equipped with an objective lens driving mechanism (hereinafter, also referred to as an actuator) for focusing control and tracking control. Here, focusing control refers to causing an objective lens to follow wobbling of a disc surface, the lens collecting a laser beam from semiconductor laser for irradiation of a target position on the disc medium, while tracking control refers to causing the objective lens to follow decentering from a track. The optical pickup device automatically adjusts the objective lens such that a relative positional relation between a target position on the disc medium and a laser beam spot is always maintained constant.

Focusing control and tracking control are realized by detecting return light of the beam collected by the objective lens for irradiation of the disc medium. For example, as disclosed in Japanese Patent Laying-Open Nos. 6-176371 and 2-5228, normally, when a light receiving element such as a photodiode receives return light of the beam, an actuator is operated based on an output from the light receiving element. That is, feedback control is achieved.

Figure 7:
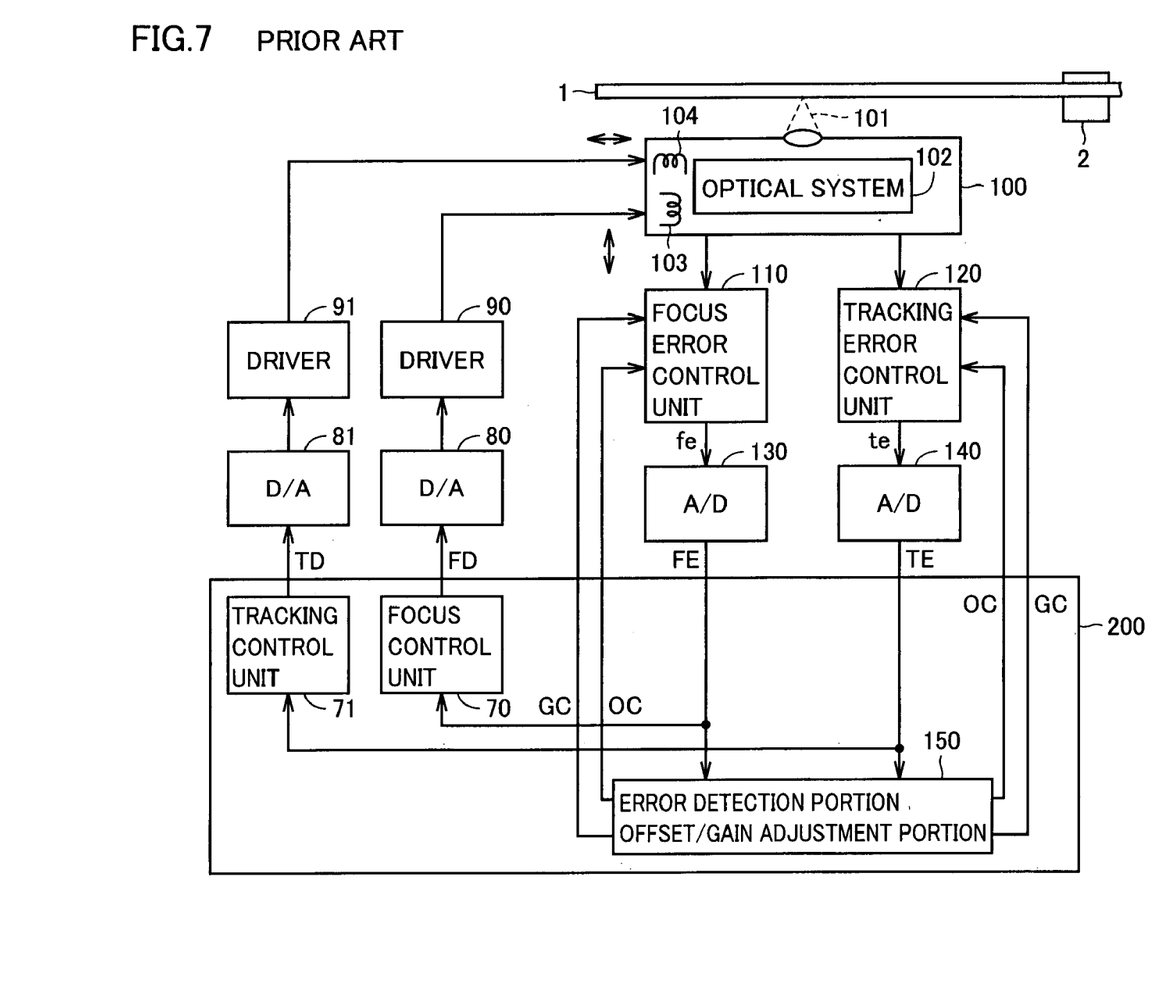
FIG. 7 is a diagram showing a configuration of a main portion of a conventional optical recording and reproduction apparatus.

FIG. 7 shows a configuration of a main portion of a conventional optical recording and reproduction apparatus disclosed in Japanese Patent Laying-Open No. 6-176371.

Referring to FIG. 7, the optical recording and reproduction apparatus includes an optical head 100 arranged so as to face an optical disc 1, a focus error detection portion 110, a tracking error detection portion 120, analog-digital converters (hereinafter, also referred to as A/D converter) 130, 140, a processor 200, digital-analog converters (hereinafter, also referred to as D/A converter) 80, 81, and drivers 90, 91.

Optical head 100 includes a focus actuator 103, a tracking actuator 104, and an optical system 102.

Focus error detection portion 110 is constituted of a not-shown photodiode portion and an amplifier unit. In the photodiode portion, a photodiode (not shown) divided into four regions receives reflected light from optical disc 1. Then, sum signals (a+c) and (b+d) are obtained by calculating sums of outputs from one pair (a, c) and another pair (b, d) of regions located diagonal to each other among these four regions (denoted as a, b, c, and d, for example).

The amplifier unit receives sum signals (a+c) and (b+d) output from the photodiode portion as inputs, and outputs an output voltage proportional to a difference between the input signals (a+c)−(b+d) as a focus error signal fe.

Tracking error detection portion 120 is also constituted of a not-shown photodiode portion and an amplifier unit. In the photodiode portion, when a photodiode (not shown) divided into two regions (denoted as e, f, for example) receives reflected light from the optical disc, signals e and f are output in accordance with an amount of reflected light.

The amplifier unit receives output signals e, f from the photodiode portion as inputs, and outputs an output voltage proportional to a difference between the input signals (e−f) as a tracking error signal te.

Focus error signal fe and tracking error signal te are converted to digital focus error signal FE and tracking error signal TE in A/D converters 130, 140 respectively, for input to processor 200.

Processor 200 includes a focus control unit 70 generating a focus drive signal FD based on focus error signal FE and a tracking control unit 71 generating a tracking drive signal TD based on tracking error signal TE. Generated focus drive signal FD and tracking drive signal TD are converted to analog signals by D/A converters 80, 81 respectively, for input to drivers 90, 91.

Driver 90 drives focus actuator 103 based on focus drive signal FD so that a beam spot focuses. Driver 91 drives tracking actuator 104 based on tracking drive signal TD so that a beam spot 101 is positioned in the center of a track.

Here, focus error signal fe and tracking error signal te output from error detection portions 110, 120 respectively tend to exhibit variation in gain and offset, depending on variation in optical disc 1 and optical system 102. Accordingly, A/D converters 130, 140 receiving these error signals fe, te need to have a wide dynamic range so as to accept also such variation in processor 200. On the other hand, an A/D converter with a wide dynamic range is expensive, resulting in an increase in the cost of the apparatus.

As shown in FIG. 7, a portion for adjusting gain and offset of error signals fe, te is provided in processor 200. An output from an error detection portion gain/offset adjustment portion 150 can be used to automatically correct variation in the gain and offset in each of error detection portions 110, 120.

With such a configuration, a dynamic range of A/D converters 130, 140 can be narrowed, and reduction in the cost of the apparatus can be achieved.

On the other hand, in the optical recording and reproduction apparatus described above, error signals fe, te input to A/D converters 130, 140 respectively are generated by performing addition and subtraction of the outputs based on the light received at the photodiode portions in focus error detection portion 110 and tracking error detection portion 120 respectively. Therefore, a dynamic range sufficient for taking in a calculation result is necessary in A/D converters 130, 140, which means that the apparatus is still expensive. For example, when output amplitude (peak to peak value) of the output based on the received light is assumed to be 1V, the output amplitude of focus error signal fe is comparable to 4V. Here, the A/D converter needs to have a dynamic range for covering this amplitude.

In connection with large output amplitude of the error signal, a range of adjustment of the offset and gain also becomes wider. Accordingly, control of these factors becomes complicated, resulting in cost increase.

SUMMARY OF THE INVENTION

An object of the present invention is to provide an optical recording and reproduction apparatus capable of focusing control and tracking control in a stable manner with low cost.

According to one aspect of the present invention, an optical recording and reproduction apparatus includes a light receiving element detecting an amount of reflected light of a light beam from an optical disc and outputting an electric signal in accordance with the amount of reflected light; an amplifier unit amplifying the electric signal output from the light receiving element; an analog-digital converter converting the electric signal output from the amplifier unit to a digital signal; an error signal generation portion subjecting the electric signal output from the analog-digital converter to arithmetic processing so as to generate a focus error signal and a tracking error signal; and a control unit outputting first and second control signals for adjusting offset and gain for the electric signal output from the amplifier unit. The control unit detects the electric signal output from the analog-digital converter, and outputs the first control signal for providing the electric signal with the offset so that a direct current component in the electric signal is equal to a median in a dynamic range of the analog-digital converter and the second control signal for adjusting the gain so that output amplitude of the electric signal is within the dynamic range of the analog-digital converter. The amplifier unit adjusts the offset and the gain for the electric signal in accordance with the first and second control signals and inputs the amplified electric signal to the analog-digital converter.

Preferably, the amplifier unit includes a differential amplifier amplifying a potential difference between the electric signal and a reference voltage, a first variable resistor for providing the reference voltage with offset, coupled to a first input terminal of the differential amplifier, and a second variable resistor for varying gain, coupled between an output terminal and a second input terminal of the differential amplifier. The first variable resistor has a resistance value adjusted in accordance with the first control signal, and the second variable resistor has a resistance value adjusted in accordance with the second control signal.

Preferably, the control unit includes a central processing unit.

According to the optical recording and reproduction apparatus of the present invention, the electric signal output from the light receiving element is directly input to the A/D converter, so as to generate the error signal from the digitized electric signal. Accordingly, as compared with the conventional optical recording and reproduction apparatus in which the error signal generated by subjecting the electric signal to arithmetic processing is input to the A/D converter, the optical recording and reproduction apparatus according to the present invention can be configured with the A/D converter with a narrow dynamic range, thereby attaining lower cost for the apparatus.

In addition, the direct current component of the electric signal input to the A/D converter is offset and gain thereof is adjusted. In this manner, even when the dynamic range is narrow, stable servo control can be achieved without saturation of a waveform of the electric signal.

Moreover, a range of offset adjustment in the RF amplifier unit in which offset adjustment for the electric signal is performed is made narrower than that in the conventional optical recording and reproduction apparatus in which the error signal is offset. Therefore, facilitated control and further cost reduction can be achieved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, embodiments of the present invention will be described in detail with reference to the figures. It is noted that the same reference characters refer to the same or corresponding components in the figures, and description thereof will not be repeated.

[First Embodiment]

Figure 1:
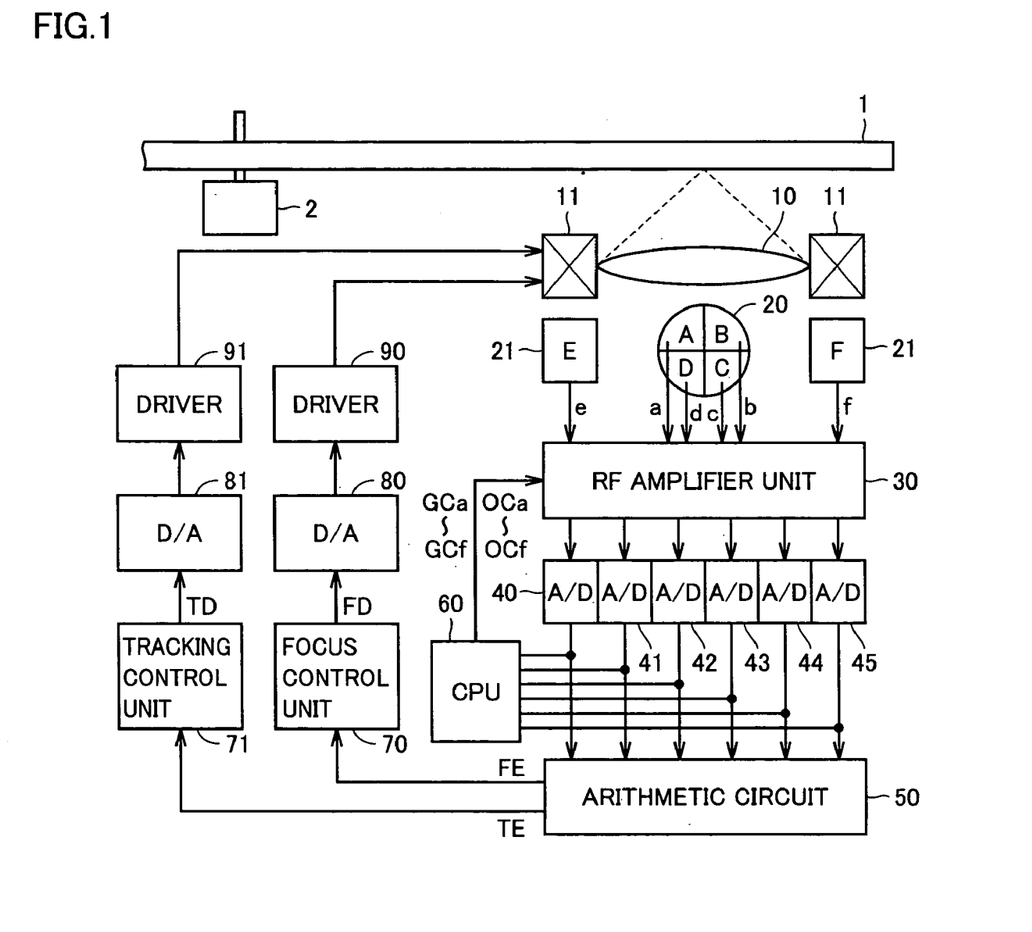
FIG. 1 is a diagram showing a configuration of a main portion of an optical recording and reproduction apparatus according to a first embodiment of the present invention.

FIG. 1 is a diagram showing a configuration of a main portion of an optical recording and reproduction apparatus according to a first embodiment of the present invention.

Referring to FIG. 1, the optical recording and reproduction apparatus includes an optical pickup device constituted of an objective lens 10 collecting a beam emitted from a not shown light source on optical disc 1 and an actuator 1 for controlling and driving objective lens 10 in a focus direction and in a tracking direction; a light receiving element portion receiving the beam reflected on a recording surface of optical disc 1, an RF amplifier unit 30, and A/D converters 40 to 45.

The light receiving element portion is constituted of a photodetector 20 divided into four sectors so that dividing lines form a cross, and a photodetector 21 divided into two parts.

Photodetector 20 includes four regions A to D formed by division into halves in a radial direction of optical disc 1 and further division into halves in a tangential direction thereof. When the beam of the reflected light from optical disc 1 is collected and enters photodetector 20, four regions A, B, C, and D output electric signals a, b, c, and d in accordance with an amount of input reflected light respectively.

Photodetector 21 includes two regions E and F formed by division into halves in a radial direction of optical disc 1. When the beam of the reflected light from optical disc 1 is collected and enters photodetector 21, two regions E and F output electric signals e and f in accordance with an amount of input reflected light respectively.

RF amplifier unit 30 is constituted of a plurality of differential amplifiers receiving respective electric signals a to f as input voltages. RF amplifier unit 30 subjects electric signals a to f to differential amplification for output.

A/D converters 40 to 45 are arranged in parallel corresponding to the output signals from RF amplifier unit 30. A/D converters 40 to 45 digitize and output electric signals a to f input through RF amplifier unit 30.

The optical recording and reproduction apparatus further includes an arithmetic circuit 50 subjecting the output signals from A/D converters 40 to 45, that is, digitized electric signals a to f, to arithmetic processing so as to generate focus error signal FE and tracking error signal TE, an CPU 60, focus control unit 70, tracking control unit 71, D/A converters 80, 81, and drivers 90, 91.

Though not shown, arithmetic circuit 50 includes two adder circuits and a subtracter circuit. The adder circuits calculate a sum signal (a+c) based on the electric signals from regions A and C and a sum signal (b+d) based on the electric signals from regions B and C respectively, which regions are located diagonally to each other among four regions on photodetector 20 respectively. Sum signals (a+c) and (b+d) based on the electric signals and indicating addition results are output to the subtracter circuit. The subtracter circuit calculates a difference (a+c)−(b+d) between two sum signals (a+c) and (b+d), and provides a result thereof to focus control unit 70 as focus error signal FE.

Arithmetic circuit 50 further includes a not-shown subtracter circuit. The subtracter circuit calculates a difference (e−f) between electric signals e and f from regions E, F on photodetector 21, and provides a result thereof to tracking control unit 71 as tracking error signal TE.

As described above, an error signal is generated based on a three beam method in the present embodiment. Known other techniques for generating an error signal include push-pull method, astigmatic method, and the like. These methods can also be used in the present invention. When the astigmatic method is employed, tracking error signal TE can be obtained as signal (a+c)−(b+d), which is found from calculation of electric signals a to d from four-sector photodetector 20, in a manner similar to that in obtaining focus error signal FE.

Focus control unit 70 and tracking control unit 71 generate focus drive signal FD and tracking drive signal TD based on obtained error signals FE, TE respectively.

Generated focus drive signal FD and tracking drive signal TD are converted to analog signals in D/A converters 80, 81 respectively for input to drivers 90, 91.

Driver 90 drives actuator 11 in a focus direction based on focus drive signal FD so that a beam spot focuses. Driver 91 drives actuator 11 in a tracking direction based on tracking drive signal TD so that beam spot 101 is positioned in the center of a track.

The optical recording and reproduction apparatus according to the present embodiment is different from the conventional optical recording and reproduction apparatus shown in FIG. 7 in that the signals input to A/D converters 40 to 45 are not error signals fe, te obtained by processing electric signals a to f detected by the light receiving element portion but electric signals a to f themselves.

More specifically, in the conventional optical recording and reproduction apparatus shown in FIG. 7, focus error signal fe (=(a+c)−(b+d)) and tracking error signal te (=(e−f)) are input to A/D converters 130, 140 respectively. In contrast, in the present embodiment, electric signals a to f output from photodiodes 20, 21 are input to A/D converters 40 to 45 respectively.

According to the present embodiment, as the output amplitude of the input signal to the A/D converter is made smaller, the dynamic range of the A/D converter can be narrower. Ideally, whereas focus error signal (a+c)−(b+d) is generated from calculation of four electric signals a to d, the output amplitude of a single electric signal is ¼ of the former, which means that the dynamic range of the A/D converter can be narrowed to ¼. Therefore, the apparatus can be configured with an inexpensive A/D converter with a narrow dynamic range, thereby attaining reduction in the cost.

In addition, recently, as higher integration of an LSI (large scale integrated circuit) is demanded, a circuit that has been mounted on an analog IC portion tends to be mounted integrally with a digital IC portion, making transition from analog process to digital process.

In the present embodiment, an arithmetic circuit mounted on the digital IC portion generates an error signal, instead of the RF amplifier unit mounted on the analog IC portion. Therefore, the apparatus can be made smaller.

As described above, according to the present embodiment, the electric signals detected by the photodetector are directly input to the A/D converters, so as to achieve narrower dynamic range of the A/D converter. On the other hand, if the output amplitude of the electric signal is not within the dynamic range, the waveform of the electric signal is saturated and accuracy in servo control is lowered.

Then, offset and gain for the electric signals are adjusted. With such adjustment, saturation of the waveform of the electric signal possible in the A/D converter with the narrow dynamic range is avoided, and stable servo control is achieved. In addition, in the present embodiment, RF amplifier unit 30 attains a function of offset adjustment and gain adjustment, so as to realize stable servo control.

Figure 2:
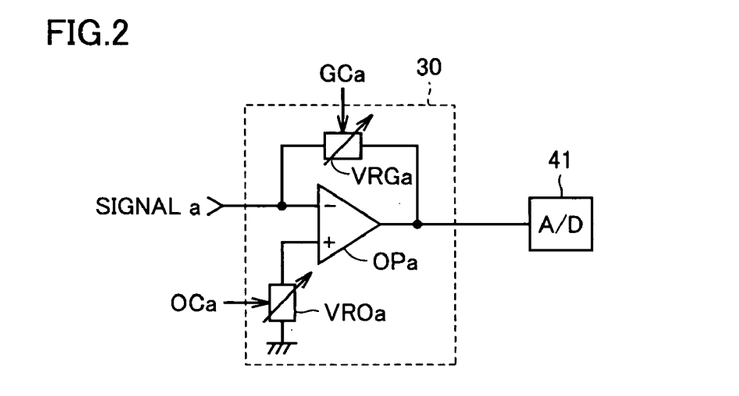
FIG. 2 is a diagram showing a configuration of an RF amplifier unit shown in FIG. 1.

FIG. 2 is a diagram showing a configuration of RF amplifier unit 30 shown in FIG. 1. RF amplifier unit 30 includes a plurality of differential amplifiers OPa to OPf arranged corresponding to electric signals a to f respectively. As differential amplifiers OPa to OPf are configured in the same manner, FIG. 2 shows differential amplifier OPa arranged corresponding to electric signal a as a representative.

Referring to FIG. 2, differential amplifier OPa is an inverting amplifier, and receives electric signal a at an inversion input terminal as an input. An output terminal of differential amplifier OPa is coupled to an input terminal of A/D converter 41. A variable resistor VRGa is coupled between the inversion input terminal and the output terminal as a feedback resistance. A variable resistor VROa is coupled between a non-inversion input terminal and a ground potential.

A resistance value of variable resistor VROa connected to the non-inversion input terminal is adjusted by differential amplifier OPa, so as to offset an output voltage of differential amplifier OP. Namely, variable resistor VROa serves as an offset adjustment portion.

In addition, a resistance value of variable resistor VRGa is adjusted by differential amplifier OPa, so as to increase/decrease gain of differential amplifier OPa. Namely, variable resistor VRGa serves as a gain adjustment portion.

Similarly, variable resistors VROb to VROf serving as offset adjustment portions and variable resistors VRGb to VRGf serving as gain adjustment portions are arranged in not-shown differential amplifiers OPb to OPf respectively.

Resistance values of variable resistors VROa to VROf are adjusted in accordance with control signals OCa to OCf from CPU 60 shown in FIG. 1.

Referring again to FIG. 1, CPU 60 takes in output signals from A/D converters 40 to 45 so as to measure a direct current (DC) level of each output signal. CPU 60 compares the obtained DC level with the reference voltage (comparable to a median in the dynamic range of the A/D converter), and calculates a difference therebetween. CPU 60 transmits control signals OCa to OCf to variable resistors VROa to VROf in RF amplifier unit 30 so that the difference attains "0", that is, the DC level of the output signal is equal to the reference voltage.

Variable resistors VROa to VROf have resistance values adjusted in accordance with corresponding control signals OCa to OCf respectively. Accordingly, the output voltages of differential amplifiers OPa to OPf (that is, input signals to A/D converters 40 to 45) are offset, and the DC level is set to the median in the dynamic range.

Resistance values of variable resistors VRGa to VRGf are adjusted in accordance with control signals GCa to GCf from CPU 60. CPU 60 takes in output signals from A/D converters 40 to 45 so as to measure a potential difference (output amplitude) between a maximum value and a minimum value of each output signal. CPU 60 further determines whether or not the obtained potential difference is within a dynamic range of the A/D converter. If the potential difference is not within the dynamic range, CPU 60 transmits control signals GCa to GCf to variable resistors VRGa to VRGf in RF amplifier unit 30 so that the potential difference is within the dynamic range.

Variable resistors VRGa to VRGf have resistance values adjusted in accordance with corresponding control signals GCa to GCf respectively. Accordingly, gain of differential amplifiers OPa to OPf is adjusted, and the output voltages (that is, input signals to A/D converters 40 to 45) are adjusted such that the output amplitude is within the dynamic range.

As described above, offset and gain of electric signals a to f are adjusted in RF amplifier unit 30 in accordance with the dynamic range of A/D converters 40 to 45. Therefore, stable servo control can be achieved also in the A/D converter with the narrow dynamic range.

In addition, as the output amplitude of a single electric signal is small, a range of adjustment of offset and gain is also small, leading to facilitated control thereof. Thus, cost reduction can be achieved.

Figure 3:
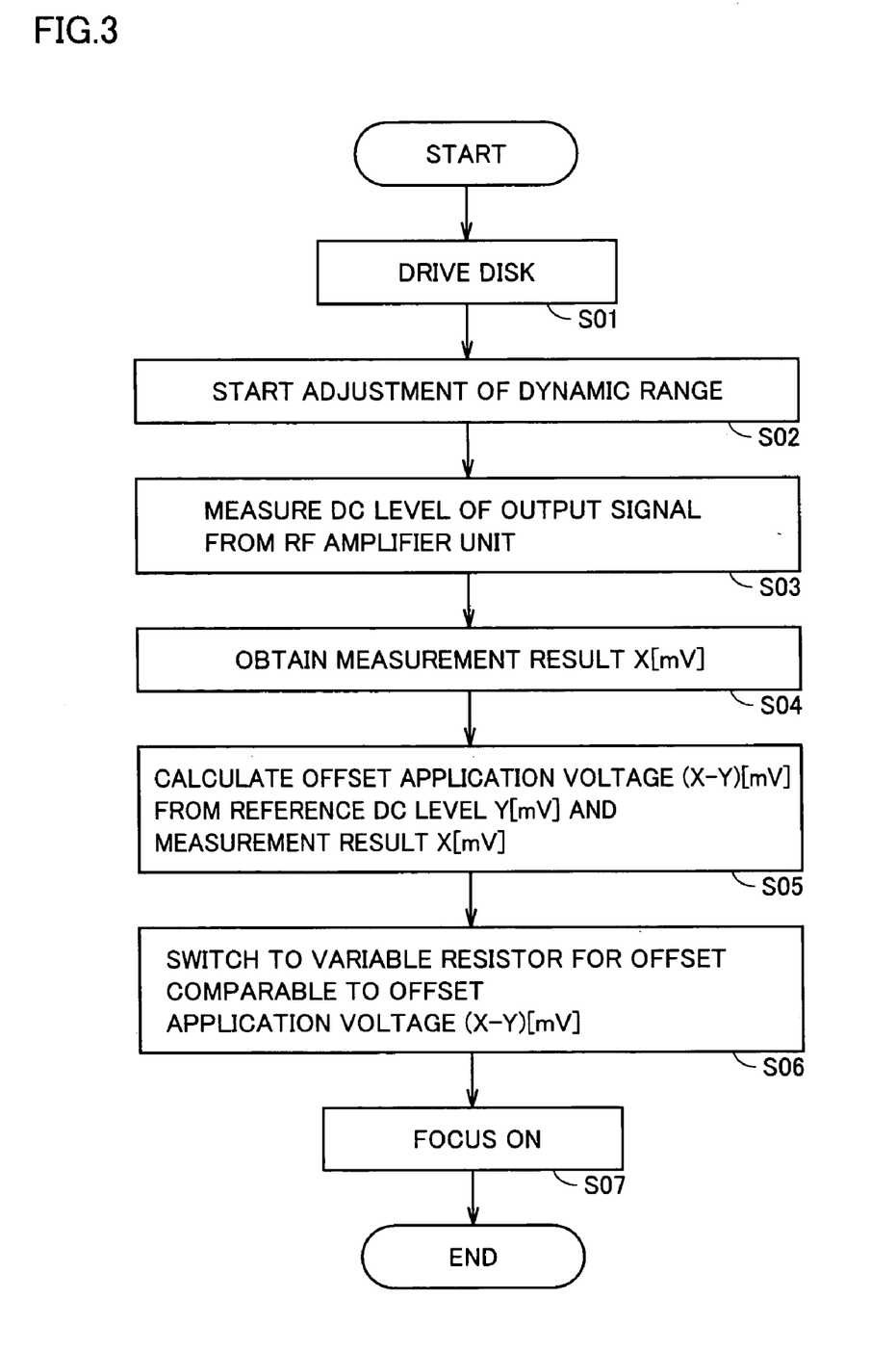
FIGS. 3 and 4 are flowcharts illustrating an offset adjustment operation in the RF amplifier unit shown in FIG. 2.

FIG. 3 is a flowchart illustrating an offset adjustment operation in RF amplifier unit 30 shown in FIG. 2.

Normally, when focus servo is applied, the focus actuator is first moved up and down while the focus servo is in an off state, so as to set a range allowing correct detection of a focus error signal. When the focus error signal enters that range, an error signal having an "S" shape appears in the focus error signal. After zero crossing of the focus error signal is observed, focus servo is turned on, so as to complete focus servo.

In the present embodiment, when the optical recording and reproduction apparatus is switched on, optical disc 1 is driven (step S01). While the focus servo is in the off state, adjustment of the dynamic range of A/D converters 40 to 45 is started (step S02), in order to ensure the dynamic range when focus servo is turned on.

As described previously, the dynamic range of A/D converters 40 to 45 is adjusted by measuring the DC level of the output signal from RF amplifier unit 30 (step S03). More specifically, electric signals a to f output from photodetectors 20, 21 are input to A/D converters 40 to 45 through RF amplifier unit 30. CPU 60 takes in electric signals a to f digitized by and output from A/D converters 40 to 45 respectively, and detects the DC levels thereof (X[mV], for example) (step S04).

Then, CPU 60 calculates a voltage to be applied for offset (hereinafter, referred to as "offset application voltage") (X−Y)[mV] from measurement result X[mV] of the DC level of electric signals a to f and a reference DC level (Y[mV], for example) (step S05). Reference DC level Y[mV] is comparable to the median in the dynamic range of A/D converters 40 to 45.

In addition, CPU 60 outputs control signals OCa to OCf for offset by offset application voltage (X−Y)[mV] to each of variable resistors VROa to VROf in RF amplifier unit 30. Variable resistors VROa to VROf arranged for differential amplifiers OPa to OPf respectively in RF amplifier unit 30 have resistance values adjusted in accordance with corresponding control signals OCa to OCf respectively (step S06).

At step S06, when the DC level of the output signal of RF amplifier unit 30 is offset and the center of the signal is set equal to the reference DC level, focus servo is turned on (step S07).

Thereafter, the optical recording and reproduction apparatus performs a not-shown focus search operation. Here, electric signals a to f input to A/D converters 40 to 45 respectively attain the DC levels set equal to the median in the dynamic range through the offset adjustment operation.

In addition, CPU 60 measures the maximum value and the minimum value of the amplitudes of electric signals a to f, and outputs control signals GCa to GCf so that the maximum value and the minimum value are within the dynamic range of the A/D converter. The resistance values of variable resistors VRGa to VRGf arranged for differential amplifiers OPa to OPf respectively in RF amplifier unit 30 are adjusted in accordance with control signals GCa to GCf respectively, so as to adjust gain of electric signals a to f.

As described above, electric signals a to f are adjusted individually so that offset and gain thereof are within the dynamic range of A/D converters 40 to 45. In this manner, waveform saturation does not occur in the A/D converter with a narrow dynamic range, and stable servo control can be achieved.

Figure 4:
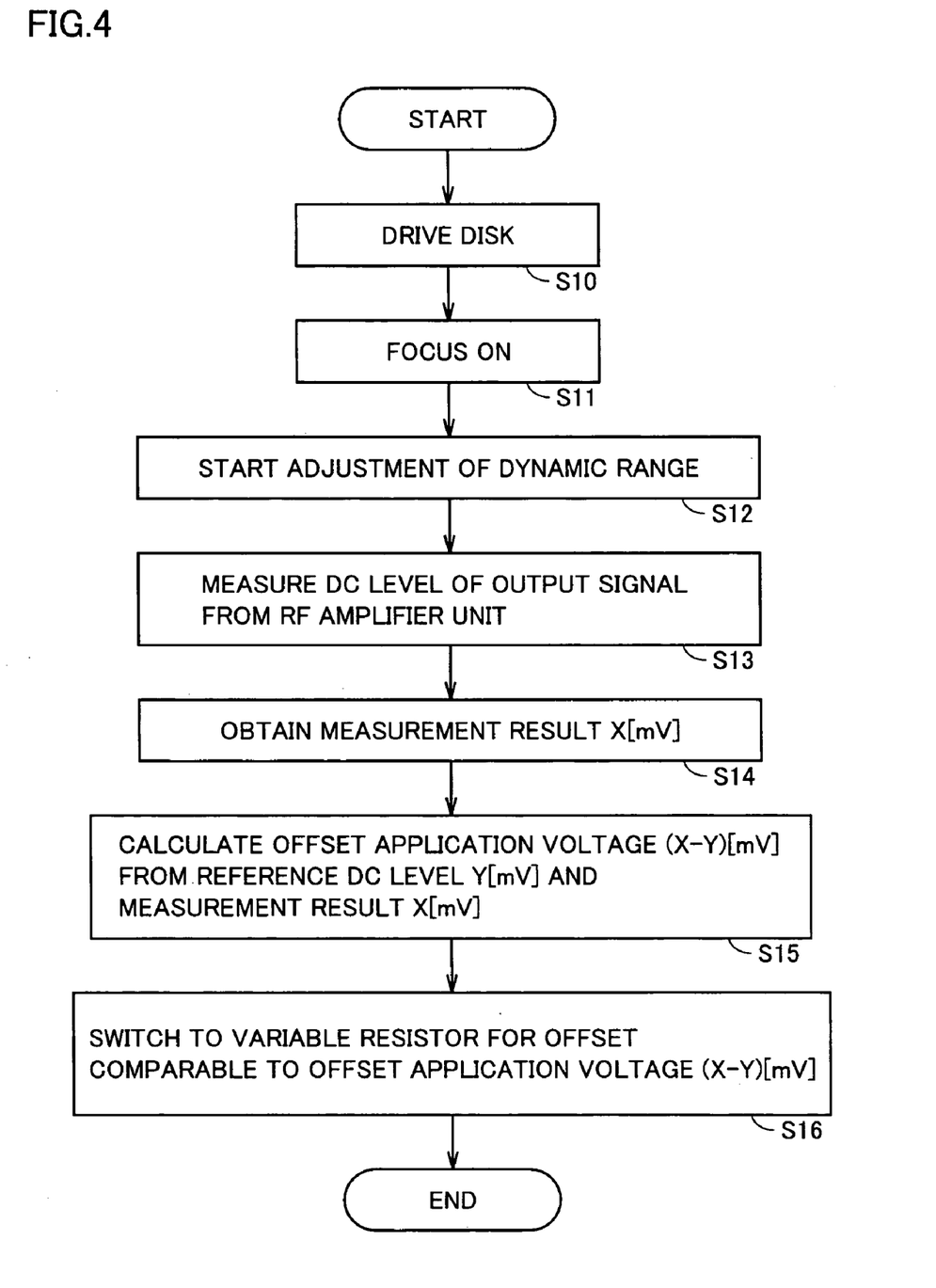

FIG. 4 is a flowchart illustrating an offset adjustment operation in RF amplifier unit 30 shown in FIG. 2.

An operation shown below is performed in order to ensure a dynamic range during the tracking search operation and a normal reproduction operation performed after focus servo is turned on by the offset adjustment operation in FIG. 3.

Initially, when optical disc 1 is driven (step S10) and focus servo enters an on state (step S11), adjustment of the dynamic range of A/D converters 40 to 45 is started (step S12).

The dynamic range is adjusted by measuring the DC level of the output signal from RF amplifier unit 30 (step S13), as in FIG. 3.

More specifically, electric signals a to f output from photodetectors 20, 21 are input to A/D converters 40 to 45 through RF amplifier unit 30. CPU 60 takes in electric signals a to f digitized by and output from A/D converters 40 to 45 respectively, and detects the DC levels thereof (X[mV], for example) (step S14).

Then, CPU 60 calculates the offset application voltage (X−Y)[mV] from measurement result X[mV] of the DC level of electric signals a to f and the reference DC level (Y[mV], for example) (step S15). Reference DC level Y[mV] is comparable to the median in the dynamic range of A/D converters 40 to 45.

CPU 60 outputs control signals OCa to OCf for offset by offset application voltage (X−Y)[mV] to each of variable resistors VROa to VROf in RF amplifier unit 30. Variable resistors VROa to VROf in RF amplifier unit 30 have resistance values adjusted in accordance with corresponding control signals OCa to OCf respectively (step S16).

As to not-shown gain adjustment, CPU 60 measures the maximum value and the minimum value of the output signal from RF amplifier unit 30, and outputs control signals GCa to GCf so that the maximum value and the minimum value are within the dynamic range of the A/D converter. The resistance values of variable resistors VRGa to VRGf in RF amplifier unit 30 are adjusted in accordance with control signals GCa to GCf respectively, so as to adjust gain of electric signals a to f.

In this manner, electric signals a to f are adjusted so as to be within the dynamic range of A/D converters 40 to 45 by setting the signal center to be equal to the reference DC level during the on state of tracking servo and during reproduction, thereby avoiding waveform saturation. Therefore, in the configuration of a servo mechanism using the A/D converter with a narrow dynamic range as well, stable servo control and reduction in the cost for the apparatus can be achieved.

As described above, according to the first embodiment of the present invention, the electric signal output from the light receiving element is directly input to the A/D converter, and the error signal is generated from the digitized electric signal. Accordingly, as compared with the conventional optical recording and reproduction apparatus in which the error signal generated by subjecting the electric signal to arithmetic processing is input to the A/D converter, the optical recording and reproduction apparatus according to the present invention can be configured with the A/D converter with a narrow dynamic range, thereby attaining lower cost for the apparatus.

In addition, the direct current component of the electric signal input to the A/D converter is offset and gain thereof is adjusted. In this manner, even when the dynamic range is narrow, stable servo control can be achieved without saturation of a waveform of the electric signal.

Moreover, a range of offset adjustment in the RF amplifier unit in which offset adjustment for the electric signal is performed is made narrower than that in the conventional optical recording and reproduction apparatus in which the error signal is offset. Therefore, facilitated control and further cost reduction can be achieved.

[Second Embodiment]

Figure 5:
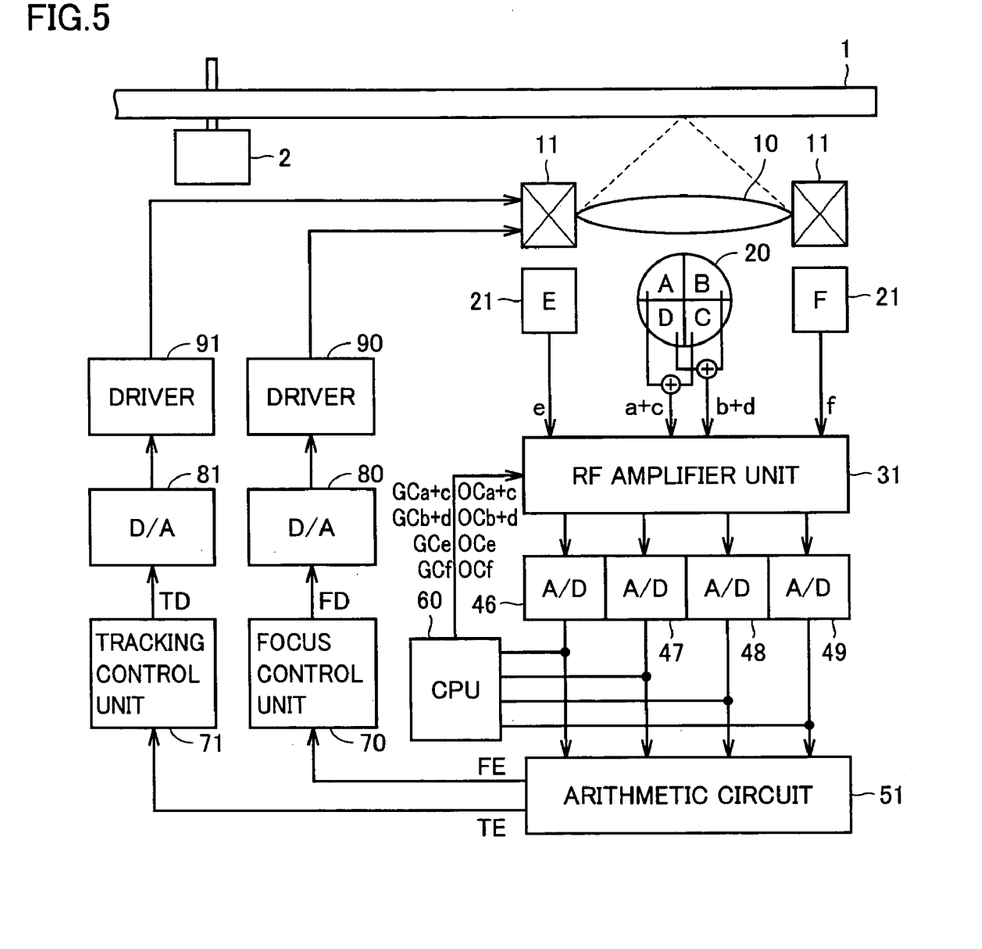
FIG. 5 is a diagram showing a configuration of an optical recording and reproduction apparatus according to a second embodiment of the present invention.

FIG. 5 is a diagram showing a configuration of an optical recording and reproduction apparatus according to a second embodiment of the present invention.

Referring to FIG. 5, the optical recording and reproduction apparatus includes an optical pickup device constituted of objective lens 10 collecting a beam emitted from a light source on optical disc 1 and an actuator 11 for controlling and driving objective lens 10 in a focus direction and in a tracking direction; a light receiving element portion receiving the beam reflected on the recording surface of optical disc 1, an RF amplifier unit 31, and A/D converters 46 to 49.

The optical recording and reproduction apparatus further includes an arithmetic circuit 51 subjecting the output signals from A/D converters 46 to 49 to arithmetic processing so as to generate focus error signal FE and tracking error signal TE, CPU 60, focus control unit 70, tracking control unit 71, D/A converters 80, 81, and drivers 90, 91.

The light receiving element portion includes photodetector 20 divided into four sectors so that dividing lines form a cross, and photodetector 21 divided into two parts.

Photodetector 20 includes four regions A to D formed by division into halves in a radial direction of optical disc 1 and further division into halves in a tangential direction thereof. When the beam of the reflected light from optical disc 1 is collected and enters photodetector 20, four regions A, B, C, and D output electric signals a, b, c, and d in accordance with an amount of input reflected light respectively.

Photodetector 21 has two regions E and F formed by division into halves in a radial direction of optical disc 1. When the beam of the reflected light from optical disc 1 is collected and enters photodetector 21, two regions E and F output electric signals e and f in accordance with an amount of input reflected light respectively.

Based on electric signals a to d output from photodetector 20, sum signal (a+c) of the electric signals from regions A and C and sum signal (b+d) of the electric signals from regions B and D are calculated respectively, which regions are located diagonally to each other among four regions A to D. Sum signals (a+c) and (b+d) based on the electric signals and indicating addition results are input to RF amplifier unit 31.

RF amplifier unit 31 includes a plurality of differential amplifiers receiving electric signals a+c, b+d, e, and f as input voltages respectively. RF amplifier unit 31 subjects electric signals a+c, b+d, e, and f to differential amplification for output. As described later, RF amplifier unit 31 is provided for each of the plurality of differential amplifiers, and further includes a variable resistor for adjusting offset and gain of an output level.

A/D converters 46 to 49 are arranged in parallel corresponding to output signals from RF amplifier unit 31. A/D converters 46 to 49 digitize and output electric signals a+c, b+d, e, and f input through RF amplifier unit 31 respectively.

Arithmetic circuit 51 includes not-shown first and second subtracter circuits. The first subtracter circuit calculates a difference (a+c)−(b+d) between two sum signals (a+c) and (b+d) based on the electric signals, and provides a result thereof to focus control unit 70 as focus error signal FE.

The second subtracter circuit calculates a difference (e−f) between electric signals e and f from regions E and F on photodetector 21, and provides a result thereof to tracking control unit 71 as tracking error signal TE.

Though the present embodiment has been configured such that each error signal is generated based on the three beam method as in the first embodiment, other techniques for generating an error signal may also be used.

The optical recording and reproduction apparatus drives the actuator based on generated focus error signal FE and tracking error signal TE. Since such an operation is similar to that described in the first embodiment, detailed description thereof will not be repeated.

As shown above, the optical recording and reproduction apparatus according to the present embodiment has a basic configuration similar to that in the optical recording and reproduction apparatus in the first embodiment shown in FIG. 1. On the other hand, it is different in that electric signals from the regions diagonal to each other among electric signals a to d output from photodetector 20 are added respectively for input to RF amplifier unit 30.

In the present configuration, sum signals (a+c) and (b+d) of the electric signals are input to A/D converters 47, 48 respectively and output amplitude of these signals attains ½ of the output amplitude of focus error signal (a+c)−(b+d). Therefore, a dynamic range of A/D converters 47, 48 is reduced to half the dynamic range of the A/D converter in the conventional optical recording and reproduction apparatus. Accordingly, the apparatus can be configured with an inexpensive A/D converter with a narrow dynamic range, thereby attaining cost reduction.

As compared with the configuration in the first embodiment shown in FIG. 1, the dynamic range of A/D converters 47, 48 is doubled. Meanwhile, the total number of A/D converters can advantageously be reduced.

Figure 6:
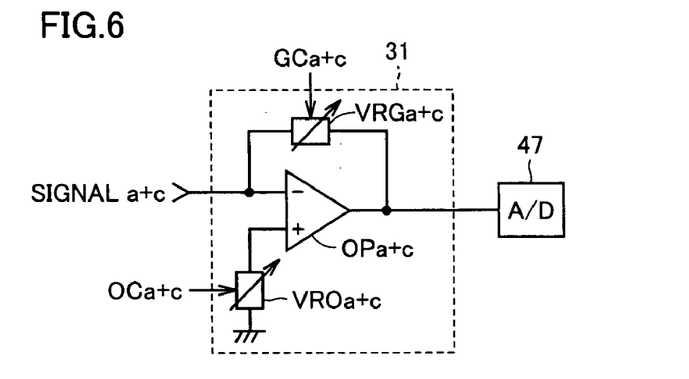
FIG. 6 is a diagram showing the configuration of the RF amplifier unit shown in FIG. 1.

FIG. 6 is a diagram showing the configuration of RF amplifier unit 31 shown in FIG. 5. RF amplifier unit 31 includes a plurality of differential amplifiers OPa+c, OPb+d, OPe, and OPf arranged corresponding to sum signals (a+c) and (b+d) of the electric signals as well as electric signals e and f respectively. As these differential amplifiers are configured in the same manner, FIG. 6 shows differential amplifier OPa+c as a representative.

Referring to FIG. 6, differential amplifier OPa+c is an inverting amplifier, and receives electric signal a+c at an inversion input terminal. An output terminal of differential amplifier OPa+c is coupled to an input terminal of A/D converter 47. A variable resistor VRGa+c is coupled between the inversion input terminal and the output terminal as a feedback resistance. A variable resistor VROa+c is coupled between a non-inversion input terminal and the ground potential.

A resistance value of variable resistor VROa+c connected to the non-inversion input terminal is adjusted by differential amplifier OPa+c, so as to offset an output voltage of differential amplifier OPa+c. Namely, variable resistor VROa+c serves as an offset adjustment portion.

In addition, a resistance value of variable resistor VRGa+c is adjusted by differential amplifier OPa+c, so as to increase/decrease gain of differential amplifier OPa+c. Namely, variable resistor VRGa+c serves as a gain adjustment portion.

Similarly, variable resistors VROb+d, VROe, VROf serving as offset adjustment portions and variable resistors VRGb+d, VROe, VRGf serving as gain adjustment portions are arranged in not-shown differential amplifiers OPb+d, OPe, OPf respectively.

Resistance values of variable resistors VROa+c, VROb+d, VROe, and VROf are adjusted in accordance with control signals OCa+c, OCb+d, OCe, and OCf from CPU 60 shown in FIG. 5.

Referring again to FIG. 5, CPU 60 takes in output signals from A/D converters 46 to 49 so as to measure the direct current (DC) level of each output signal. CPU 60 compares the obtained DC level with the reference voltage (comparable to the median in the dynamic range of the A/D converter), and calculates a difference therebetween. CPU 60 transmits control signals OCa+c, OCb+d, OCe, and OCf to variable resistors VROa+c, VROb+d, VRe, and VROf in RF amplifier unit 31 respectively so that the difference attains "0" that is, the DC level of the output signal is equal to the reference voltage.

Variable resistors VROa+c, VROb+d, VRe, and VROf have resistance values adjusted in accordance with corresponding control signals OCa+c, OCb+d, OCe, and OCf respectively. Accordingly, the output voltages of differential amplifiers OPa+c, OPb+d, OPe, and OPf (that is, input signals to A/D converters 46 to 49) are offset, and the DC level is set to the median in the dynamic range.

Resistance values of variable resistors VRGa+c, VRGb+d, VRGe, and VRGf are adjusted in accordance with control signals GCa+c, GCb+d, GCe, and GCf from CPU 60. CPU 60 takes in output signals from A/D converters 46 to 49 so as to measure a potential difference (output amplitude) between a maximum value and a minimum value of each output signal. CPU 60 further determines whether or not the obtained potential difference is within the dynamic range of the A/D converter. If the potential difference is not within the dynamic range, CPU 60 transmits control signals GCa+c, GCb+d, GCe, and GCf to variable resistors VRGa+c, VRGb+d, VRGe, and VRGf in RF amplifier unit 31 respectively so that the potential difference is within the dynamic range.

Variable resistors VRGa+c, VRGb+d, VRGe, and VRGf have resistance values adjusted in accordance with corresponding control signals GCa+c, GCb+d, GCe, and GCf. Accordingly, gain of differential amplifiers OPa+c, OPb+d, OPe, and OPf is adjusted, and the output voltages (that is, input signals to A/D converters 46 to 49) are adjusted such that the output amplitude is within the dynamic range.

As described above, the offset and gain of electric signals a+c, b+d, e, and f are adjusted in RF amplifier unit 31 in accordance with the dynamic range of A/D converters 46 to 49 respectively. Therefore, stable servo control can be achieved also in the A/D converter with the narrow dynamic range. Here, as the specific adjustment operation in the RF amplifier unit is the same as described in connection with FIGS. 3 and 4 in the first embodiment, detailed description thereof will not be repeated.

As described above, according to the second embodiment of the present invention, the electric signal output from the light receiving element is input to the A/D converter directly or after it is partially subjected to arithmetic processing, so as to generate the error signal from the obtained signal. Accordingly, as compared with the conventional optical recording and reproduction apparatus in which the error signal generated by subjecting the electric signal to arithmetic processing is input to the A/D converter, the optical recording and reproduction apparatus according to the present invention can be configured with the A/D converter with the narrow dynamic range, thereby attaining lower cost for the apparatus.

In addition, the DC level and the gain of the electric signal input to the A/D converter are adjusted. In this manner, even when the dynamic range is narrow, stable servo control can be achieved without saturation of the waveform of the electric signal.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical recording and reproduction apparatus, comprising:
    a light receiving element detecting an amount of reflected light of a light beam from an optical disc and outputting an electric signal in accordance with the amount of reflected light;
    an amplifier unit amplifying said electric signal output from said light receiving element;
    an analog-digital converter converting said electric signal output from said amplifier unit to a digital signal;
    an error signal generation portion subjecting said electric signal output from said analog-digital converter to arithmetic processing so as to generate a focus error signal and a tracking error signal; and
    a control unit outputting first and second control signals for adjusting offset and gain for said electric signal output from said amplifier unit; wherein
    said control unit detects said electric signal output from said analog-digital converter, and outputs the first control signal for providing said electric signal with the offset so that a direct current component in said electric signal is equal to a median in a dynamic range of said analog-digital converter and the second control signal for adjusting the gain so that output amplitude of said electric signal is within the dynamic range of said analog-digital converter, and
    said amplifier unit adjusts the offset and the gain for said electric signal in accordance with said first and second control signals and inputs amplified said electric signal to said analog-digital converter.

2. The optical recording and reproduction apparatus according to claim 1, wherein
   said amplifier unit includes
   a differential amplifier amplifying a potential difference between said electric signal and a reference voltage,
   a first variable resistor for providing said reference voltage with offset, coupled to a first input terminal of said differential amplifier, and
   a second variable resistor for varying gain, coupled between an output terminal and a second input terminal of said differential amplifier,
   said first variable resistor has a resistance value adjusted in accordance with said first control signal, and
   said second variable resistor has a resistance value adjusted in accordance with said second control signal.

3. The optical recording and reproduction apparatus according to claim 2, wherein
   said control unit includes a central processing unit.

* * * * *